Nov. 15, 1960     E. D. BOUTWELL     2,959,978
SCREW AND NUT ASSEMBLY
Filed Aug. 11, 1958
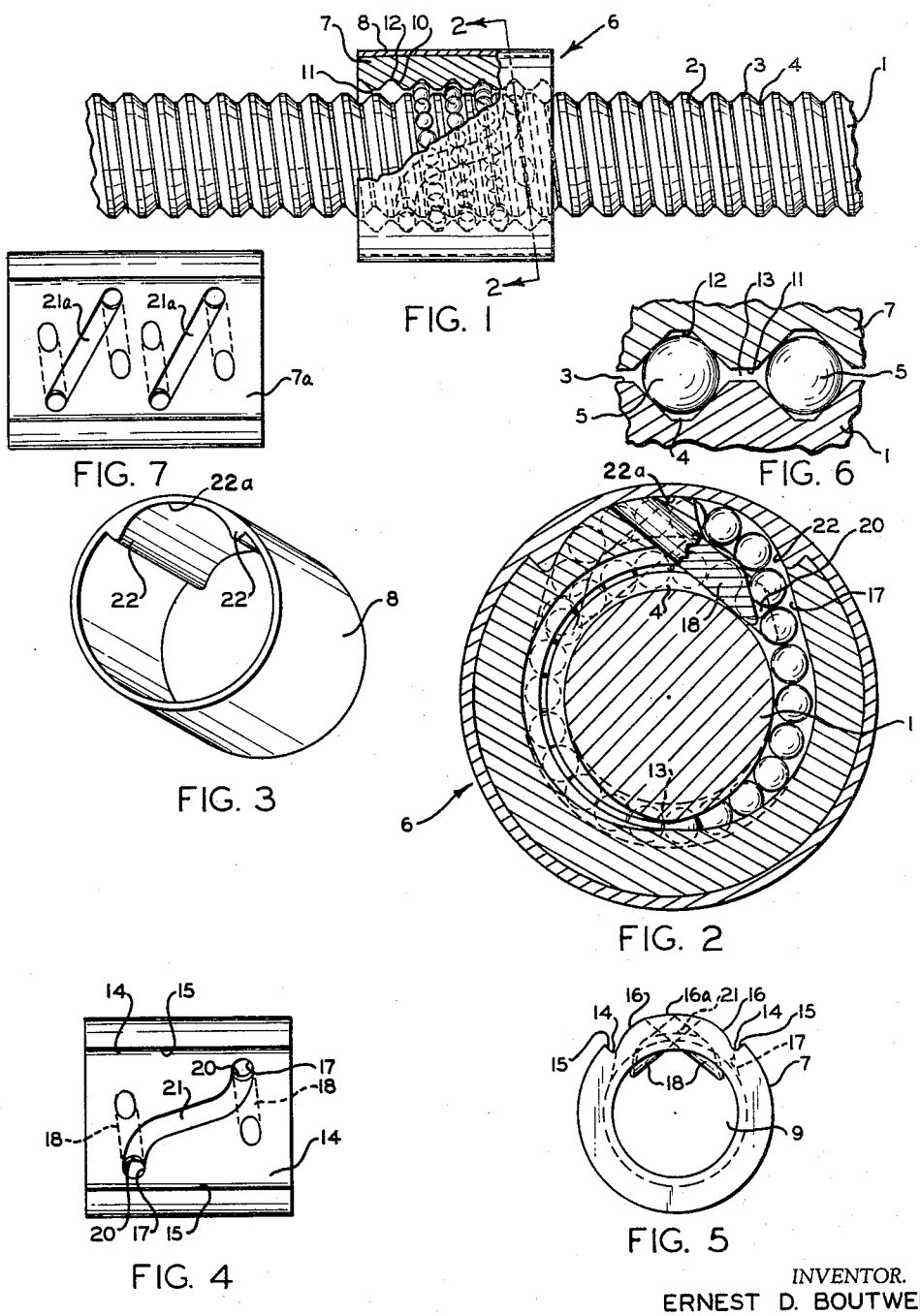
INVENTOR.
ERNEST D. BOUTWELL
BY
ATTORNEYS United States Patent Office 2,959,978
Patented Nov. 15, 1960

2,959,978

SCREW AND NUT ASSEMBLY

Ernest D. Boutwell, 306 Webber, Saginaw, Mich.

Filed Aug. 11, 1958, Ser. No. 754,228

4 Claims. (Cl. 74—459)

This invention relates to screw devices or mechanisms known as ball nut and screw assemblies. More particularly, the invention is concerned with certain improvements hereinafter enumerated in ball bearing screw and nut gears of the type in which the screw and nut are provided with corresponding helical grooves forming a helical passageway containing balls which constitute the screw thread connection between the screw and the nut, the nut gear being provided with channels or passages by means of which the balls may be recirculated through the helical passageway a large number of times.

Mechanisms of the general class to which the invention relates are quite versatile and find use in a large number of instances where it is desired to convert rotary force and motion to linear force and motion. Ball nut and screw assemblies currently in use today are subject to several criticisms, one of which is the sharpness of the turns of the ball transfer passages in the regions of communication of the transfer passages with the helical passageway between the screw and the nut. In many instances the screw or nut of an assembly will be operated at a high rate of speed with the result that the balls must travel through the transfer passages at extremely high velocities. In assemblies having sharp turns in the transfer passage the balls are quite likely to bind at the turns and interfere with the proper operation of the assembly or damage it, or both.

The great majority of ball nut and screw assemblies currently in use include transfer tubes or passages located externally of the main body of the nut, resulting in an assembly which is not symmetrical about the axis of the screw. The non-symmetry makes it difficult to provide a properly balanced nut in those instances where the nut revolves about the screw and, in those instances where the nut is stationary and the screw moves, the means for holding the nut must be formed with special equipment inasmuch as the overall dimensions of the nut are not uniform from side to side.

In one known ball nut and screw assembly the return passage is located internally of the nut, but the nut is provided with relatively thin end caps which carry deflecting fingers. Inasmuch as the deflecting fingers are carried by the end caps, the end caps may not be subjected to high pressures by nut retaining devices without fear of interfering with the proper action of the deflecting fingers. Accordingly, the nut retaining means must be especially constructed so as not to exert forces on the ends of the nut. The necessity of providing especially constructed nut retaining devices frequently makes the cost of using known assemblies prohibitive in many installations where they would be advantageous. Another disadvantage of the assembly under consideration is that the guide fingers are struck out from the end caps and leave openings through which dirt may enter the assembly.

An object of this invention is to provide a ball nut and screw assembly in which the ball-accommodating passages are so constructed as to eliminate sharp turns and thereby overcome tendencies of the balls to bind in the passages.

Another object of the invention is to provide a ball nut and screw assembly in which the ball-accommodating passages are all located wholly within the confines of the nut and in which the nut is symmetrical about the axis of the screw.

A further object of the invention is to provide an assembly of the kind referred to in which the ball-accommodating passages are located inwardly from the ends of the nut and in which the ends of the nut are capable of being subjected to high pressures without interference to the action of the balls.

Still a further object of the invention is to provide a ball nut and screw assembly which readily lends itself to a wide variety of applications without necessitating the provision of special nut retaining devices.

Another object of the invention is to provide a ball nut and screw assembly which deters the entry of dirt thereto.

Other objects and advantages of the invention will be pointed out specifically or will become apparent from the following description when it is considered in conjunction with the appended claims and the accompanying drawings, in which:

Figure 1 is a fragmentary view partly in elevation and partly in section showing a ball nut and screw assembly formed in accordance with one embodiment of the invention;

Figure 2 is an enlarged, sectional view taken on the line 2—2 of Figure 1;

Figure 3 is an isometric view of a portion of the apparatus;

Figure 4 is an elevational view of another portion of the apparatus;

Figure 5 is an end elevational view of the part shown in Figure 4;

Figure 6 is an enlarged, fragmentary, sectional view illustrating the ball-accommodating threads of the screw and the nut; and Figure 7 is a view similar to Figure 4, but illustrating a modified form of the invention.

A ball nut and screw assembly formed in accordance with the embodiment of the invention shown in Figures 1–6 comprises a screw member 1 having a plurality of uniformly spaced threads 2 extending longitudinally thereof and comprising alternating nodes 3 and roots 4, the roots being of such size as to accommodate ball bearings 5 therein with a slight space between a ball and the base of the root to prevent dirt which may enter the assembly from obstructing movement of the balls. The assembly also includes a nut member 6 comprising an inner body member 7 and an outer shell or sleeve 8, the body member having an axial bore 9 extending therethrough and provided with threads 10 composed of alternating nodes 11 and roots 12 simlar to corresponding elements of the screw 1 and which cooperate with the latter to form a helical passageway 13 for the balls 5.

Referring particularly to Figures 2, 4 and 5, the external surface of the nut body 7 is provided with a pair of circumferentially spaced, longitudinally extending grooves 14. The circumferentially remote edges 15 of the grooves are formed substantially on the radius of the body member 7 so as to provide a rather abrupt wall for each of the grooves, but the circumferentially adjacent edges 16 of the grooves are formed on the arc of a circle of smaller radius than the bore 9 and the edges 16 of each groove merge with the outer diameter of the body 7 at a zone 16a about midway between the grooves.

Adjacent to, but inwardly from, each end of the nut body 7 is drilled an opening or passage 17 of a diameter corresponding substantially to the diameter of the balls 5 and being of such length that it opens into the bore 9 of the nut body. The location of each passage 17 is such that it opens into the bore 9 at a point near the root 12 of one of the nut threads 10 and each opening 17 is drilled in such manner that it extends through the body 7 along a line which is substantially tangential to the bore. The purpose of the passages 17 is to permit balls to emerge from and reenter the passageway 13. In order to facilitate the movement of the balls to and from the pasages 17, the nut body 7 is provided with a pair of deflecting pins 18 which may be fixed in openings drilled into the body prior to the drilling of the passages 17. The pin-accommodating openings parallel the pitch of the screw threads 2 and are so located that each of the pins 18 extends into the bore of the nut body 7 a substantial distance and is received in the root 4 of the screw thread 2. As is best shown in Figure 2, each of the deflector pins 18 is located substantially tangentially of the screw 1 and extends into the passageway 13. As was pointed out previously, the pins 18 are fixed in the nut body 7 prior to the drilling of the passages 17. As a result, the drilling of the passages 17 also causes the leading ends of the pins 18 to be drilled to provide a substantially semicircular groove 20 forming one wall of each passage 17.

The exterior of the portion 16a of the nut body 7 may be provided with an open channel 21 interconnecting the passages 17 along a line which is generally at an angle to the axis of the body and being of such depth as to accommodate the balls 5 without having any portion of the latter extending beyond the part of greatest diameter of the portion 16a.

As has been pointed out, the nut body 7 is adapted to be received within the cylindrical sleeve 8. The inner surface of the sleeve is provided with a pair of projections 22 formed to complement the grooves 14 and the intervening portion 16a and extending the full length of the sleeve 8. The outer surface of the sleeve is circular so that when the parts 7 and 8 are assembled the member 6 is symmetrical about the longitudinal axis of the bore 9. The construction and arrangement of the projections 22 are such that when the parts 7 and 8 are assembled the inner surface of each projection 22 forms a continuation of the outer peripheral wall of each passage 17 and provides a smoothly rounded path of a relatively large radius for guiding the balls 5 from the passages 17 to the channel 21. The portion 22a of the sleeve 8 lying between the projections 22 forms a cover or closure for the channel 21 and, since the projections 22 and the intervening portion 22a correspond exactly to the curvature of the portions 16 and 16a of the nut body 7, the balls 5 are unrestricted in their passage to and from the channel 21. As will be apparent from Figure 4, each of the bends of the channel 21 is formed on a fairly large radius so as to avoid binding of the balls as they traverse the channel 21.

In the operation of the apparatus, relative movement between the screw and the nut 6 will cause balls to be deflected from the passageway 13 to one or the other of the passages 17 from which they will be conducted via the channel 21 to the other passage 17 and reintroduced to the passageway 13. The relative movement of the screw and the nut may be extremely rapid without risking binding of the balls 5 in the passages and passageway inasmuch as there are no sharp turns which must be negotiated by the balls.

It will be clear from Figure 2 that the assembled apparatus is symmetrical about the longitudinal axis of the screw 1 and it will be clear from Figure 1 that pressure exerted on the ends of the nut 6 will not have any adverse effect on the passages, the deflecting pins or the balls. As a result, no special holding devices are necessary to restrain movement of the nut 6, if it is desired that the screw be movable longitudinally of the nut. Consequently, apparatus constructed in accordance with the invention is capable of being used in many instances where the cost of special nut holding devices heretofore was pro-hibitive. Moreover, the ends of the nut are closed, thereby deterring the entry of dirt to the assembly.

The embodiment of the invention shown in Figure 7 comprises a nut body member 7a which is similar to the body 7 in all respects except that the body member 7a is provided with a plurality of return channels 21a and a corresponding increase in the number of passages 17. Each of the channels 21a is substantially shorter in length than the channel 21 previously described, so the bends in the channels may be dispensed with. In all other respects, the body 7a is identical to the body 7 and is adated to cooperate with the sleeve 8 in the same manner. Accordingly, those parts of the body 7a which are the same as the body 7 are identified by the same reference characters.

The disclosed embodiments are representative of presently preferred forms of the invention, but are intended to be illustrative rather than definitive thereof. The invention is defined in the claims.

I claim:

1. A screw and nut assembly comprising a screw; a nut having an axial bore receiving said screw, said screw and nut having cooperating threads forming a helical passageway for balls; a first opening extending through said nut into said bore at the root of a thread of said nut; a second opening extending through said nut into said bore at the root of a thread of said nut; said first and second openings being axially spaced from one another and extending into said bore from opposed directions along lines substantially tangential thereto; ball deflector means carried by said nut and associated with each of said openings, each of said deflector means extending into said passageway at its associated opening and forming with its opening a ball passage extending substantially tangentially of said threads; a channel formed in the external surface of said nut and interconnecting said openings, said channel having a base formed by said nut and being of a depth corresponding substantially to the diameter of said passages; cover means supported on said nut and forming an external closure for said channel; and guide surfaces provided on said cover means adjacent each of said passages for guiding balls to and from said channel from and to said passages, said guide surfaces being arcuate and forming a smoothly rounded juncture between said channel and each of said passages.

2. The assembly set forth in claim 1 wherein said channel extends helically and wherein said nut is provided with a pair of axial grooves located one adjacent to each end of said channel, said grooves receiving said guide means.

3. A screw and nut assembly comprising a screw, a nut having an axial bore receiving said screw, said screw and nut having cooperating threads forming a helical passageway for balls; a first opening extending through said nut into said bore at the root of a thread of said nut; a second opening extending through said nut into said bore at the root of a thread of said nut; said first and second openings being axially spaced from one another and extending into said bore from opposed directions along lines substantially tangential thereto; ball deflector means carried by said nut and associated with each of said openings for deflecting balls to and from said openings from and to said passageway; a channel formed in the external surface of said nut and interconnecting said openings, said channel having a base formed by said nut and being of a depth corresponding substantially to the diameter of said passages; cover means supported on said nut and forming an external closure for said channel; and guide surfaces provided on said cover means adjacent each of said openings for guiding balls to and from said channel from and to said openings, said guide surfaces being arcuate and forming a smoothly rounded juncture between said channel and each of said openings.

4. The assembly set forth in claim 3 wherein said channel extends helically and wherein said nut is provided with a pair of axial grooves located one adjacent to each end of said channel, said grooves receiving said guide means.

References Cited in the file of this patent

UNITED STATES PATENTS

| | | |
|---|---|---|
| 576,199 | Kimball | Feb. 2, 1897 |
| 2,298,011 | Hoffar | Oct. 6, 1942 |
| 2,343,507 | Hoffar | Mar. 7, 1944 |
| 2,468,506 | Millns | Apr. 26, 1949 |
| 2,780,943 | Stump | Feb. 12, 1957 |
| 2,844,044 | Cole | July 22, 1958 |

FOREIGN PATENTS

| | | |
|---|---|---|
| 769,129 | France | June 5, 1934 |